United States Patent [19]

Macdonald

[11] Patent Number: 4,938,825
[45] Date of Patent: Jul. 3, 1990

[54] PROCESS FOR MANUFACTURING LAMINATED BATH TUB OR SHOWER TRAY

[75] Inventor: Keith M. Macdonald, Solihull, England

[73] Assignee: Armitage Shanks Limited, Stratfordshire, England

[21] Appl. No.: 378,478

[22] Filed: Jul. 12, 1989

Related U.S. Application Data

[63] Continuation of Ser. No. 150,452, Jan. 29, 1988, abandoned, which is a continuation of Ser. No. 829,545, Feb. 12, 1986, abandoned, which is a continuation of Ser. No. 663,888, Oct. 23, 1984, abandoned.

[30] Foreign Application Priority Data

Oct. 28, 1983 [GB] United Kingdom ............ 8328898

[51] Int. Cl.⁵ .............................. B29C 45/14
[52] U.S. Cl. ................... 156/245; 156/285; 264/46.4; 264/46.7; 264/46.8; 264/259; 264/328.6; 4/580; 4/584; 4/596; 4/612; 4/DIG. 9
[58] Field of Search ............. 156/245, 285; 264/46.4, 264/46.5, 46.7, 46.8, 259, 260, 271.1, 275, 279.1, 279.2, 328.1, 328.6; 4/580, 584, 592, 593, 596, 612, 614, DIG. 9

[56] References Cited

U.S. PATENT DOCUMENTS

| 3,673,617 | 7/1972 | Schulz ............... 4/DIG 9 |
| 3,908,862 | 9/1975 | Chandra ............... 222/63 |
| 3,981,671 | 9/1976 | Edwards ............... 425/453 |
| 4,053,545 | 10/1977 | Fay ............... 4/614 |
| 4,067,071 | 1/1978 | Altman et al. ............... 4/580 |
| 4,158,585 | 6/1979 | Wright ............... 156/245 |
| 4,282,285 | 8/1981 | Mohiuddin ............... 264/328.6 |
| 4,338,270 | 7/1982 | Uffindel ............... 264/46.4 |
| 4,340,562 | 7/1982 | Gross ............... 264/328.2 |
| 4,350,739 | 9/1982 | Mohiuddin ............... 264/328.6 |
| 4,444,832 | 4/1984 | Mazzola ............... 428/290 |
| 4,465,734 | 8/1984 | Laroche et al. ............... 156/245 |
| 4,486,368 | 12/1984 | Hancock ............... 264/328.6 |
| 4,562,032 | 12/1985 | Gaudreau ............... 264/328.6 |

FOREIGN PATENT DOCUMENTS

| 0018663 | 11/1980 | European Pat. Off. . |
| 2344588 | 3/1974 | Fed. Rep. of Germany . |
| 2928714 | 3/1980 | Fed. Rep. of Germany . |
| 2332855 | 6/1977 | France . |
| 904763 | 8/1962 | United Kingdom ............ 4/593 |
| 1065121 | 4/1967 | United Kingdom . |
| 1211820 | 11/1970 | United Kingdom . |
| 1211920 | 11/1970 | United Kingdom . |
| 1431434 | 4/1972 | United Kingdom . |
| 1414466 | 4/1975 | United Kingdom . |
| 1430479 | 3/1976 | United Kingdom . |
| 1457935 | 12/1976 | United Kingdom . |
| 2042964 | 10/1980 | United Kingdom . |
| 2075330 | 11/1981 | United Kingdom . |

Primary Examiner—Caleb Weston
Attorney, Agent, or Firm—Brooks, Haidt, Haffner & Delehunty

[57] ABSTRACT

A laminated article, for example a bath or shower-tray, is manufactured by providing a preformed shell, for example a thermoformed acrylic sheet, which shell is placed in a mould, together with, if required, a reinforcing board, for example of chipboard or plywood. The mould is then closed and materials are injected into the mould cavity which react to form a reinforcing layer on the shell. Preferably, the injected materials comprise a polyol reactant and an isocyanate reactant which form a layer of rigid polyurethane foam. A reinforcing agent, for example glass fibre, and a blowing agent may also be introduced into the mould cavity.

13 Claims, 5 Drawing Sheets

PROCESS FOR MANUFACTURING LAMINATED BATH TUB OR SHOWER TRAY

This application is a continuation of application Ser. No. 07/150,452, filed Jan. 29, 1988, now abandoned, which in turn is a continuation of application Ser. No. 06/829,555, filed Feb. 12, 1986, now abandoned, which in turn is a continuation of application Ser. No. 06/663,888, filed Oct. 23, 1984, now abandoned.

FIELD OF THE INVENTION

The principal invention relates for the manufacture of laminated articles, especially vessels such as baths, shower-trays and the like, and to the articles manufactured by that process.

BACKGROUND OF THE INVENTION

The principal method of manufacturing plastics baths, shower-trays and the like consists of forming a thermoplastic shell with a high surface finish and attaching a second layer by spraying on a mixture of fibreglass and polyester resin. The sprayed-on material is then subjected to the successive stages of rolling, in order to consolidate the material and remove entrapped air, and curing at about 70° F. (21° C.) in order to harden the material. To impart rigidity a base made of chipboard, for example, is adhered to the bottom of the unit. This also serves to receive a support frame.

The disadvantages of this process can be summarised as follows.

1. An externally adhered base board may under certain circumstances become delaminated. It may also lack durability under unfavourable atmospheric conditions, e.g. high humidity; it is susceptible to attack by pests; and it detracts from the aesthetic appeal of the unit to the customer.

2. The existence of a fibre/resin spraying stage necessitates the adoption of stringent precautions to maintain an atmosphere that complies with health and safety regulations.

3. The spraying stage is a manual operation and in order to ensure compliance with regulations regarding the minimum weight for a given area the quantity of material applied will frequently be much in excess of requirements.

4. The cycle time (i.e. the manufacturing time per unit) is fairly lengthy, typically about 25 minutes.

Reaction injection moulding (RIM)—which expression herein includes reinforced reaction injection moulding (RRIM)—is a closed-tool technique in which reactant streams are brought together under pressure to form a polymer directly in the mould. This technique is described by C. M. Hall in an article entitled "Reaction Injection Molding" in Modern Plastics Encyclopedia 1982-1983, McGraw-Hill Inc. (1982), pages 355-357, and has found particular application in the automobile industry because of the demand for lightweight structural parts such as bumper units and fascia panels. The technique and apparatus for carrying it out have been described in the patent literature; for example, U.S. Pat. No. 3,981,671 (B. L. Edwards) discloses a mould suitable for the liquid reaction moulding of solid polyurethane articles and means for clamping the mould components, and U.S. Pat. No. 3,908,862 (R. S. Chandra and K. L. Stone) discloses an apparatus suitable for dispensing predetermined ratios of polyol and polyisocyanate liquids in the reaction injection moulding of polyurethane articles. The teachings of these U.S. patents and of the above-mentioned article by C. M. Hall are incorporated herein by reference.

SUMMARY OF THE INVENTION

It has now surprisingly been found that the RIM technique can be employed in the production of laminated articles, especially vessels such as baths, shower-trays and the like. Accordingly, the present invention provides a process for the manufacture of a laminated article, which process comprises the steps of inserting a preformed shell into a matching, closable mould, which mould provides space for a layer of reinforcing material; injecting materials into the said space that are capable of reacting therein to form a reinforcing layer on the shell; and demoulding the resultant laminated article.

In certain preferred embodiments, a reinforcing board is inserted into the mould prior to the injection of the materials that form the reinforcing layer; if appropriate, other fittings may be introduced into the mould at this stage. Fittings may, of course, be attached to the article after demoulding. After the injection of the materials forming the reinforcing layer the mould will usually be left for a period of time sufficient for completion of the reaction and for the substantial curing of the resultant polymer or synthetic resin.

DESCRIPTION OF PREFERRED EMBODIMENTS

Figure 1:
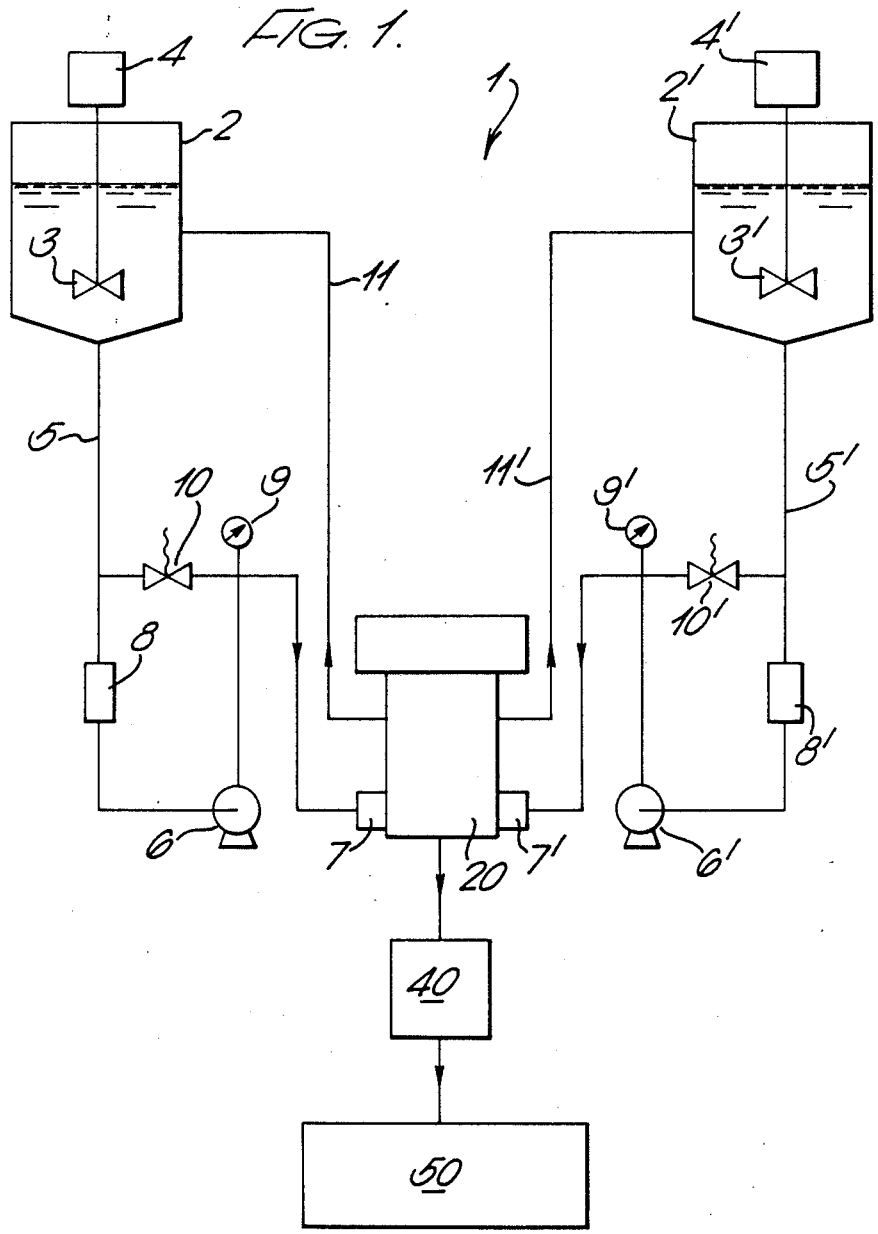
FIG. 1 is a flow chart of a system that may be employed to mix reactants prior to their introduction into a mould.

The preformed shell is conveniently produced by thermoforming a suitable thermoplastic material. Preferably, the shell is manufactured by thermoforming, by conventional vacuum-aided or pressure-aided techniques, a thermoplastic acrylic sheet to provide a surface layer for the finished article having an appearance and properties appropriate to the intended function of that article. Thus, in the case of a bath, shower-tray or the like, the thermoformed shell should have a smooth, well-finished appearance together with a low water absorption, a low water-vapour transmission, a good chemical resistance and a good impact resistance. Preferably, the shell material will be selected to ensure that the finished bath or shower-tray conforms to the draft European C.E.N. Standard TC 86.

Particularly preferred plastics materials for the shell are cell-cast acrylic and continuous-cast acrylic. Where a lower quality of finished article can be tolerated, it would also be possible to fabricate the shell from other materials, such as extruded acrylic, co-extruded acrylic/ABS blends or poly(vinyl chloride). The shell material may be pigmented or otherwise coloured, and this can be achieved by conventional means.

The thickness of the preformed shell will be determined largely by the demands that will be placed upon the finished article although typically the thickness will be from 2 to 7 mm. With cell-cast or continuous-cast acrylic sheet, good results have been obtained with a shell thickness of 3.2 mm for a bath and of 5 mm for a shower-tray.

Prior to the reaction injection moulding step, it is generally desirable to degrease the surface of the preformed shell to which the reinforcing material is to adhere. This is conveniently effected, prior to the insertion of the shell into the mould, by wiping that surface with a suitable solvent, for example acetone.

As mentioned above, the article may be provided with a reinforcing board, which board is preferably inserted into the mould prior to the introduction of the reactants forming the reinforcing layer, whereby the board may be encapsulated within the finished article. For most applications, a reinforcing board need only be incorporated within the base of the article. Such a baseboard serves two main functions: first, it acts as a stiffener, that is to say it takes up or distributes point loads on the article (e.g. as when a bather sits in a bath or stands in a shower-tray) and, second, it provides a material to which fittings may be securely attached. Suitable materials for the reinforcing board are wood composites, e.g. plywood and chipboard. The thickness of the reinforcing board will usually be from 5 to 10 mm, typically 8 mm.

The reinforcing layer is preferably a polyurethane, which is produced by injecting into the mould a mixture of a polyol material and an isocyanate material; it will be understood, of course, that the polyol material and the isocyanate material may each comprise a mixture of compounds and that each may comprise one or more desired additives. The polyurethane is preferably in the form of a rigid foam, especially one having a high density and a closed cell structure. Such foams are known as structural materials and are distinct from the flexible polyurethane foams and the polyurethane elastomers (see the article by R. J. G. Dominguez entitled "Polyurethane" in Modern Plastics Encyclopedia 1982-1983, the teaching of which article is incorporated herein by reference). In general, structural foam in the density range 400 to 800 kg/m$^3$ has been found suitable. Rigid elastomers having a density in that range may also be considered.

In the reaction injection moulding of the polyurethane foam reinforcing layer, a blowing agent, preferably a halocarbon, may be employed in an appropriately small quantity. The blowing agent can be mixed with at least one of the liquid reactants prior to the RIM stage.

It is possible to select the reactants and/or the additives in order to produce a polymeric material having a dense skin. This can confer improved properties on the reinforcing layer, for example a harder surface and improved rigidity.

Although polyurethanes are at present the preferred materials for the reinforcing layer, on the grounds of strength, impermeability to water, cost and the comparatively short cycle time, other materials that can be formed by reaction injection moulding come into consideration, for example epoxy resins, polyesters and polyamides, e.g. nylon. The reinforcing layer should be rigid and non-friable.

For most applications, it will be adequate to form a reinforcing layer having a thickness of from 5 to 10 mm, 8 mm being typical.

The reinforcing layer formed by reaction injection moulding may comprise one or more reinforcing agents and/or fillers, such a reinforcing agent being initially blended with at least one of the liquid reactants. A reinforcing agent will generally comply with the requirements that it should not react chemically with the other components in the mix, that it should have a low aspect ratio (in order to reduce viscosity) and that it should display a good adhesion with respect to the matrix (i.e. the polymer of the reinforcing layer formed in the RIM stage). Preferred reinforcing agents are hammer milled or chopped strand glass fibres, flake glass, wollastonite and mica, amongst which 1/16-inch (1.6 mm) milled glass fibres are especially suitable.

Turning now to the accompanying drawings (in which like parts are indicated by like numerals), FIG. 1 is a flow chart indicating the arrangement of apparatus suitable for the production of articles by a process according to this invention. The apparatus comprises a material supply system, indicated generally by 1, a self-cleaning mixing head 20, an aftermixer 40 and a mould 50. A first reactant and a second reactant are supplied from respective supply tanks 2, 2'. Each tank is provided with an agitator 3, 3', adapted to be driven by a motor 4, 4', and with appropriate temperature-control means (not shown).

Each reactant is fed from its supply tank 2, 2' through a supply line 5, 5' under the action of a positive displacement pump, e.g. a swash plate metering pump 6, 6' to an inlet nozzle 7, 7' which directs material into the mixing head 20. Each side of the supply system is provided with a filter 8, 8', a pressure gauge 9, 9' and a safety valve 10, 10'. A reactant may be discharged from the mixing head 20 and returned to the appropriate supply tank via a recirculation line 11, 11'.

Figure 2:
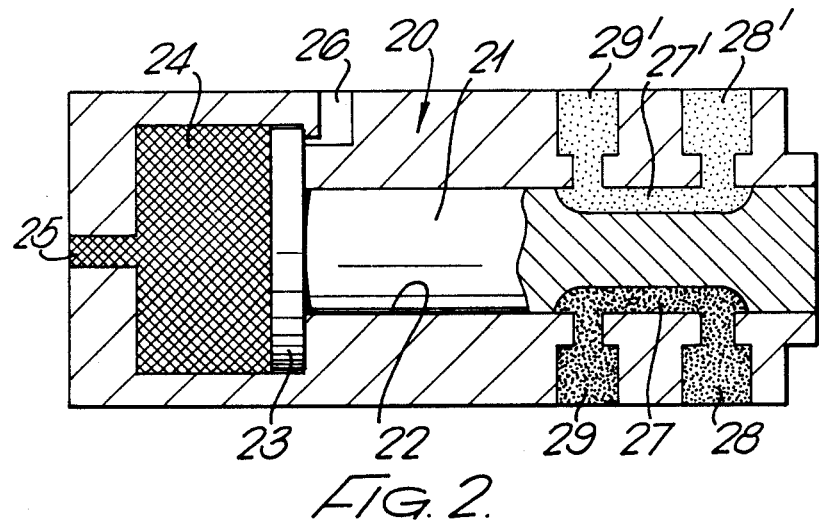
FIG. 2 is a diagrammatic longitudinal cross-section through the primary mixer of the system shown in FIG. 1, said primary mixer being in a state that causes recirculation of the reactants.
Figure 5:
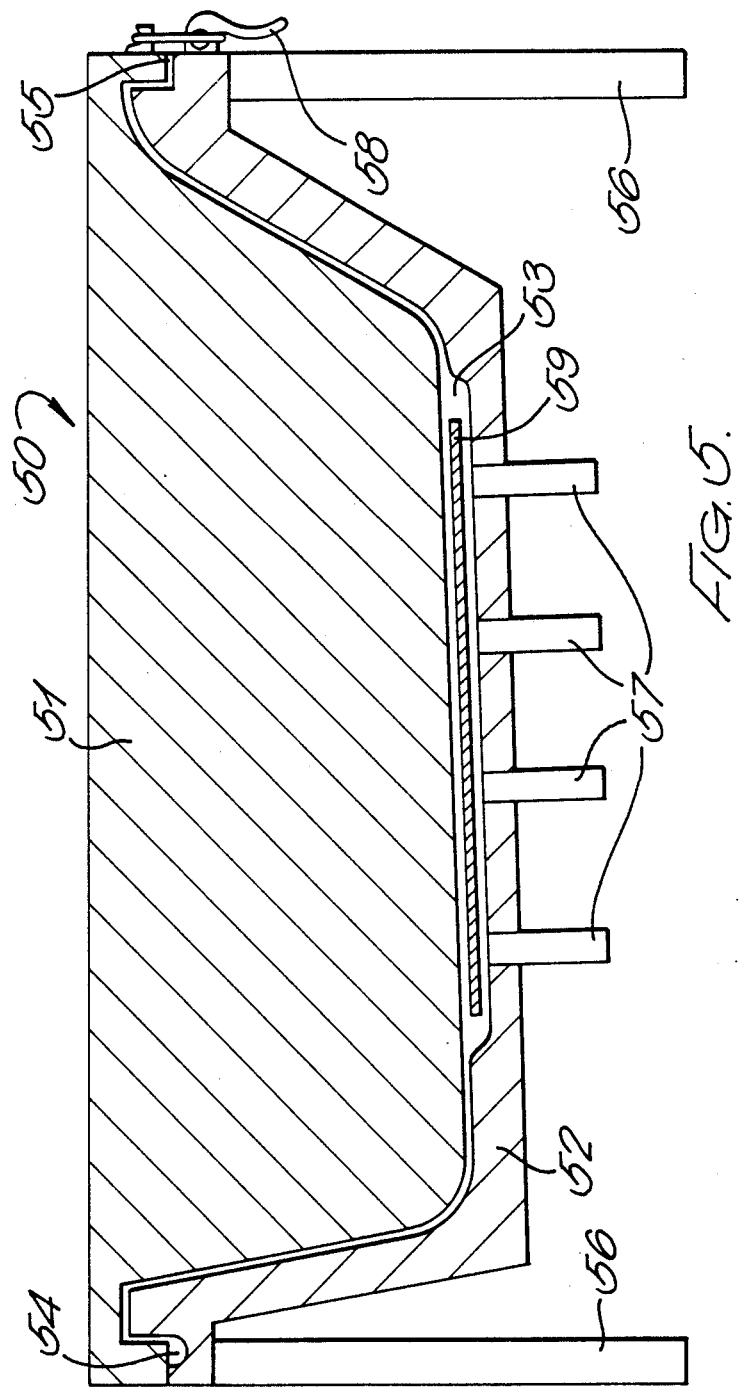
FIG. 5 is a diagrammatic longitudinal cross-section through a closable mould for the production of baths.

As shown in FIGS. 2 and 5, the mixing head 20, which serves as a primary mixer, comprises an hydraulically operated plunger 21 slideably mounted in a liquid-tight manner within a central bore 22 in the mixing head. The plunger 21 is provided with a head which acts as a piston 23 and which is accommodated within a piston chamber 24 having inlet/outlet means 25 to one side of the piston 23 and inlet/outlet means 26 to the other side. The plunger 21 may be advanced by introducing a fluid, such as oil, into the piston chamber 24 through inlet 25, hydraulic fluid on the other side of the piston 23 being exhausted through outlet 26. The plunger 21 is provided with two diametrically disposed channels 27, 27' and, as shown in FIG. 2, advancing the plunger 21 will bring each channel 27, 27' into register with a respective reactant inlet 28, 28' (which corresponds to one of the inlet nozzles 7, 7') and a respective reactant outlet 29, 29', which outlet communicates with a respective recirculation line 11, 11'.

Figure 3:
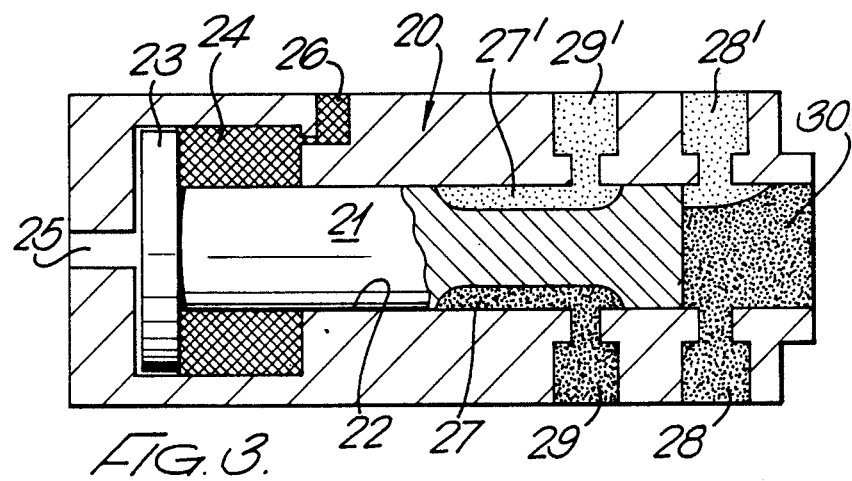
FIG. 3 is a diagrammatic section similar to that of FIG. 2, but showing the mixer in a state that brings the reactants together.

The plunger 21 may be retracted by introducing hydraulic fluid into the piston chamber 24 via inlet 26 and exhausting the hydraulic fluid on the other side of the piston 23 via outlet 25. As shown in FIG. 3, the retracted piston breaks the communication of the inlets 28, 28' with their respective reactant outlets 29, 29', thereby causing the inlet nozzles to discharge into a common mixing chamber 30. Material from the mixing chamber 30 is conveyed to the aftermixer 40 and thence to the mould 50.

Figure 4:
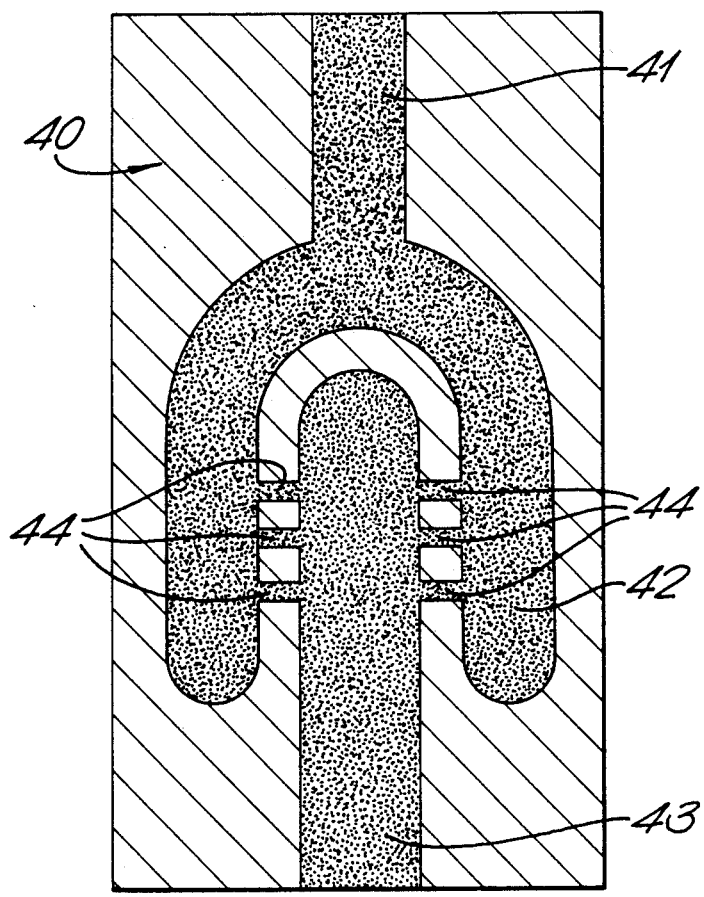
FIG. 4 is a diagrammatic longitudinal cross-section through the aftermixer in the system of FIG. 1.

As shown in FIG. 4, the aftermixer 40 comprises an inlet passage 41, which is adapted to receive the reactant mixture from the mixing head 20, which inlet communicates with an annular chamber 42. An outlet 43 is disposed centrally of the annular chamber 42 and communicates therewith via a number of small orifices 44.

The mould 50 shown in FIG. 5 is configured for the production of baths and comprises a male component 51 and a female component 52 which together define a mould cavity 53 into which the reactant mixture from the aftermixer 40 is introduced via a feed gate 54. An air vent 55 is provided at the end of the mould remote from the feed gate 54.

The female component 52 is mounted upon appropriate supports 56 and is also provided with hydraulically operated ejector pins or with screw jacks 57 which may be used to effect removal of the article from the female component in the demoulding stage. Clamping means 58 are also provided, to ensure that the mould stays closed with the mould components in the required relationship during the moulding operation.

Prior to the injection of the reactants the preformed shell would be inserted into the mould and abutting the male component 51. However, for reasons of clarity, the shell has been omitted from FIG. 5.

The lower part of the mould cavity 53, in the illustrated embodiment, is appropriately dimensioned to accommodate a reinforcing base board 59. Preferably, the female component of the tool is designed to locate the reinforcing board so that it is substantially prevented from moving in the horizontal plane. Normally, the reinforcing board is supported by preplaced spacers (not shown) so that there is a clearance between the reinforcing board and the female mould surface and, preferably, also a clearance between the reinforcing board and the shell so that the reactants may flow all around the reinforcing board to ensure that it is encapsulated by the resultant reinforcing polymer; each such clearance will be, in general. 5-10 mm, typically 8 mm. The spacers may be made, for example, from rigid polyurethane foam.

If required, additional reinforcement may be provided by inserting into the mould a structure, for example a woven or non-woven fabric, that may be permeated in the RIM stage by the reactants. Thus, for example, an increase in the strength of the finished article may be obtained by using a loosely woven glass-fibre mat in this manner.

The male and female components 51, 52 of the mould can be made from any of a number of suitable materials, for example steel, aluminium, reinforced epoxy resin or glass-reinforced polyester resin. Additional reinforcement may be required in order to prevent deformation of the mould components under the pressures exerted during the reaction injection moulding stage. The available materials differ in durability, ease of preparation and cost and the choice of the mould material may depend, for example, on whether it is to be used for full-scale commercial production or for prototyping and low-volume applications. The mould may be equipped with temperature-control means (not shown) e.g. heating/cooling tubes, in order to achieve the optimum temperature for the completion of the reaction and the curing of the resultant polymer.

It is, of course, desirable that the male component 51 should match the preformed shell as closely as possible, in order to prevent the deformation of the shell under the moulding pressures and to inhibit seepage of the reactants into spaces between the shell and the male component 51. Additional measures may be appropriate to prevent such seepage but these should be well within the competence of the skilled person; for example, sealing the edges of the acrylic shell with tape has proved effective in moulding trials.

Prior to a manufacturing run, it is highly desirable that the surfaces of the mould components be treated with a release wax. In general, it will be appropriate to apply a liquid release agent to the mould surfaces prior to each moulding shot. Mould release sprays are commercially available.

In operation, the reactants and any additives blended therewith are maintained in the supply tanks 2, 2' at a predetermined temperature and are agitated to ensure thorough mixing. Thus, for example, a polyol blend may be held in tank 2 whilst an isocyanate-based composition is held in tank 2'. Prior to the injection of the mix into the mould cavity, it is usually necessary to recirculate both reactants to ensure that the correct conditions of pressure and temperature are obtained; recirculation is effected, as indicated above, by maintaining the mixing head plunger 21 in its forward position, as shown in FIG. 2. The materials are metered through the pumps to give a repeatable delivery accuracy of ±1%.

In order to initiate the moulding stage, the plunger 21 is hydraulically retracted for the required shot time, whereupon the reactants delivered through the inlets 28, 28' impinge upon each other at high velocity and are thus thoroughly blended. After the required shot weight (typically about 8 kg in the case of a bath) has been delivered (typically at a rate of about 1 kg/s). the plunger 21 is moved again to its forward position, switching the reactant supply system to the recirculation mode. Advancing the plunger 21 also has the effect of scouring the mixing chamber of any remaining material and of sealing the mould. The design of the illustrated mixing head substantially inhibits surge, i.e. the mixing of the reactants at incorrect ratios during the first and the last fractions of the shot.

As the reactant mix leaves the mixing head, it is at a very high pressure (typically 10-20 MPa) with a great deal of turbulence. However, the aftermixer, in which the mix is forced through the small orifices 44 at high velocity, causes a considerable pressure drop and a reduction in turbulence. The quelling of turbulence is important since turbulent flow can lead to entrainment of unwanted airbubbles in the moulded layer. The mix is then delivered to the mould cavity through the feed gate 54 which controls the entry velocity and causes a further pressure drop. It will be appreciated that since the reactants are mixed together prior to their injection into the mould, they may already have commenced to react before they reach the mould. However, at the rates of delivery usual in RIM, this is of little practical significance.

Preferably, the pressure within the mould during the moulding stage is from 50 to 100 psi (345-690 kPa), a typical pressure being about 80 psi (552 kPa). The temperature of the materials injected into the mould is generally from 50° to 70° C. After the required moulding and curing time, the mould components are unclamped, the male component is removed and the mechanical screw jacks or other ejector means are operated in order to eject the reinforced article from the female component of the mould.

Figure 6:
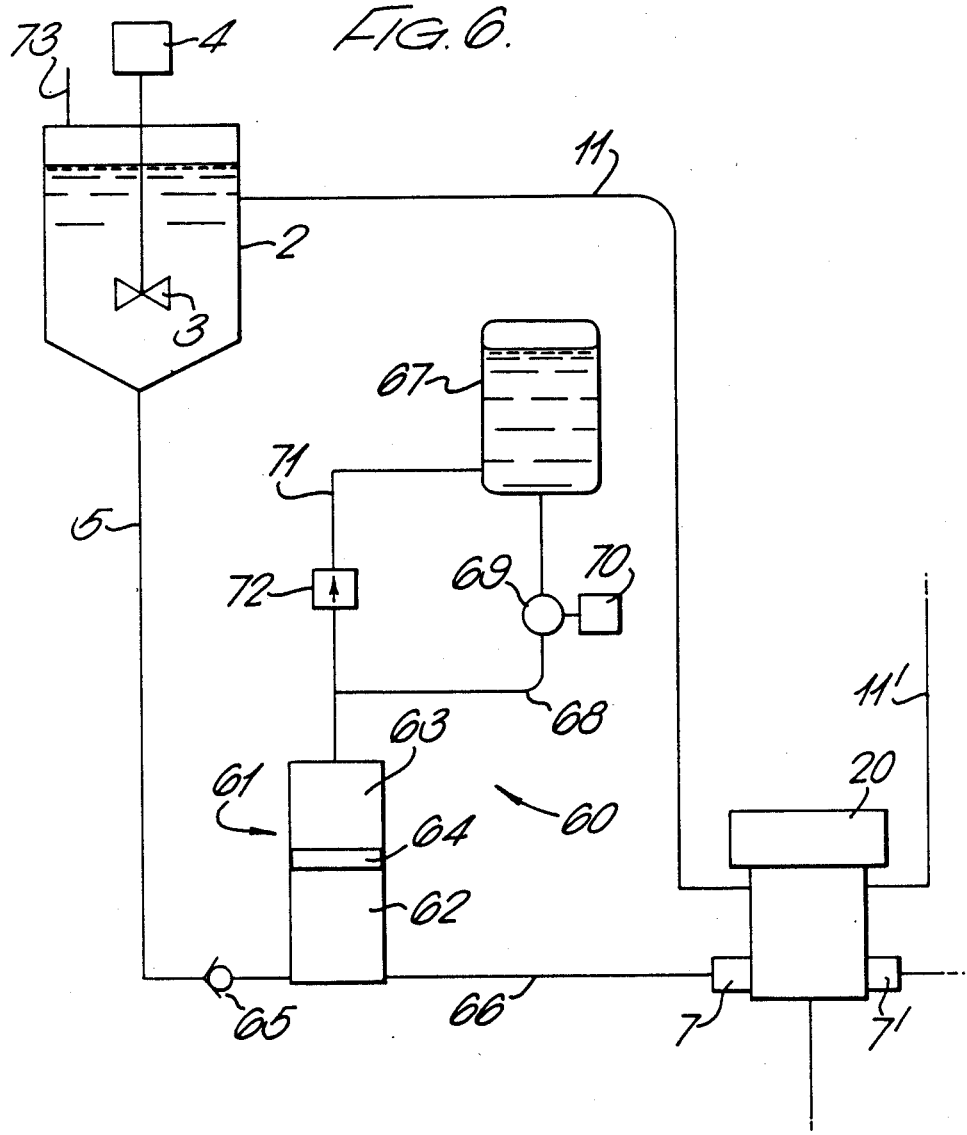
FIG. 6 is a flow chart of part of a RRIM system with a piston metering unit.

In general, the conventional high-speed metering pumps are not well-suited for the supply of a reactant in combination with an abrasive filler. However, alternative means are known in RRIM technology, for example the piston metering unit developed by Krauss-Maffei AG and which is shown schematically in FIG. 6.

In those embodiments wherein the reinforcing layer comprises polyurethane, it is preferred to incorporate the reinforcing filler in the polyol component because this is less reactive than the isocyanate. Accordingly, FIG. 6, for convenience, depicts only the system for supplying the polyol/filler mix to the mixing head 20 (the construction and operation of which are as described above). The polyol/filler mix is supplied from a temperature-controlled supply tank 2 equipped with an agitator S adapted to be driven by motor 4. The mix is withdrawn from the tank 2 through line 5 and is delivered to the inlet nozzle 7 via the metering apparatus indicated generally by 60. The metering apparatus 60 comprises a metering cylinder 61 divided into a lower chamber 62 and an upper chamber 63 by a piston 64, the chambers having of course a variable volume depending upon the position of the piston.

The lower chamber 62 of the metering cylinder 61 is adapted to receive the polyol/filler mix delivered through line 5 and the non-return valve 65. The polyol/filler mix discharged from the lower chamber 62 is fed directly to the mixing head inlet 7 through the line 66. The upper chamber 63 of the metering cylinder 61 is so arranged that it can be charged with oil from the oil storage tank 7 through line 68 which is provided with a pump 69 and an associated motor 70. Oil discharged from the upper chamber 63 is returned to the oil storage tank 67 via line 71 which is provided with a selectively closable valve 72.

The supply cycle may be described from an initial position in which the plunger 21 of the mixing head 20 is advanced in order to provide recirculation of the reactants (as described above with reference to FIG. 2). The piston 64 is at the bottom of the metering cylinder 61, i.e. the cylinder is empty of polyol/filler mix. The valve 72 is then opened, which connects the upper chamber 63 of the metering cylinder 61 with the oil storage tank 67. The polyol/filler mix is then forced into the lower chamber 62 of the metering cylinder 61 under the pressure of air (typically at 1 MPa) introduced into the upper end of the supply tank 2 through an air inlet 73. The incoming polyol/filler mix displaces the piston 64 upwards causing the oil to be discharged from the upper chamber 63 and back into the oil storage tank 67.

When the piston 64 reaches the top of its stroke it initiates a signal for the closing of the valve 72 and the starting of the motor 70 which operates the pump 69. The pump 69 is adjustable for output and, acting as a metering pump, charges the upper chamber 63 of the cylinder 61 with a preselected volume of oil. Due to the resultant downward displacement of the piston 64, a corresponding volume of polyol/filler mix is discharged from the lower chamber 62 to the mixing head inlet 7. The rate of supply of the isocyanate component is regulated accordingly. After the raw materials have been recirculated for an appropriate period of time, the plunger 21 of the mixing head 20 is retracted in order to initiate the moulding shot (as described above with reference to FIG. 3). After the appropriate shot time the mixing head plunger 21 is again advanced to cause recirculation of the raw materials in preparation for the next shot.

The process of the present invention offers a number of advantages over the known processes for manufacturing plastics vessels such as baths and shower-trays. Thus, for example, the reinforcing board, if such is employed, is encapsulated by the reinforcing layer and is thereby protected from attack by humidity and pests. Furthermore, the absence of a spraying stage renders it easier to maintain an atmosphere that complies with health and safety regulations. Moreover, the cycle time can be much less than is required by the known processes for making baths and the like and is typically five minutes or less. The short cycle time permits a given number of mouldings to be produced with fewer moulding tools.

Since the application of the reinforcing layer is no longer a manual operation, the present process permits the production of a series of articles having a uniform thickness profile that can be precisely determined beforehand. A particular advantage of this process is that it enables the production of articles having a reinforcing layer of adequate strength and rigidity even with reinforcing-layer thicknesses that are low enough to permit the demoulded articles to be nested. It will be understood that such a nesting facility is of economic importance since it permits a larger number of articles to be stored per unit of floor space than would otherwise be possible.

Although the reinforcing layer is formed in situ and is directly applied to the preformed shell in the present process, it has surprisingly been found that an excellent adhesion between the shell and reinforcing layer can be obtained. Accordingly, the articles manufactured according to this process exhibit an excellent resistance to delamination, despite the fact that such articles as baths and shower-trays are subjected repeatedly to point loads in use.

The process of the present invention is illustrated in and by the following Example.

EXAMPLE

A shower-tray was manufactured using equipment substantially as described above with reference to the drawings, and which incorporated a Cannon HC 100 high-pressure dispensing machine. The mould was generally similar to that shown in FIG. 5, although, of course, the mould components had a configuration appropriate to the production of a shower-tray.

The supply system comprised two 50 kg tanks containing, respectively, a polyol reactant (Daltolac K1328 from Imperial Chemical Industries PLC) and an isocyanate reactant (Suprasec VM 30 from Imperial Chemical Industries PLC). As a blowing agent, Arcton 11 (a halocarbon from Imperial Chemical Industries PLC) was incorporated in the polyol in an amount equivalent to 1% by weight of the reactant mixture.

A 5 mm thick acrylic sheet of the dimensions 750 mm $\times$ 750 mm $\times$ 850 mm was thermoformed to provide the shell of the shower-tray. The thermoformed acrylic shell was then placed in the two-part, temperature-controlled closable mould. An 18 mm $\times$ 580 mm $\times$ 580 mm chipboard member was then inserted into the mould to provide a rigid, encapsulated baseboard for the shower-tray unit. The mould was then locked leaving a mould cavity having a constant 5 mm gap.

When the polyol and the isocyanate reactants had reached the desired conditions of temperature and pressure, the plunger 21 in the high-pressure impingement mixing head 20 was operated to initiate injection of the reactants into the 1 cm³ mixing chamber 30 of the mixing head, in which chamber the reactants were mixed at 2000 psi (13.8 MPa) for 8 seconds.

The reactant mixture was fed into the closed-tool mould through the aftermixer and the feed gate with a pressure drop to about 80 psi (552 kPa) and in a quantity precisely metered to fill the cavity in the mould. A five-minute reaction and curing period was allowed before unlocking the mould and demoulding the shower-tray.

The reinforced shower-tray was subjected to standard tests for acrylic baths (i.e. thermocycling, impact-resistance and chemical resistance tests) and was found to perform satisfactorily.

It will of course be understood that the present invention has been described above purely by way of example, and modifications of detail can be made within the scope and spirit of the invention.

I claim:

1. A process for the manufacture of a laminated bathtub or shower-tray, wherein a reinforcing layer of polyurethane is applied to a surface of an acrylic shell, which process essentially consists of the steps of producing a preformed shell of an acrylic material; inserting the said preformed shell into a matching, closable mould, which mould provides a space for a layer of reinforcing material; forming by a reaction injection moulding step a reinforcing layer of rigid polyurethane that adheres directly to the shell which step comprises injecting into the said mould space a mixture comprising a polyol material and an isocyanate material that react therein; and demoulding the resultant laminated article.

2. A process for the manufacture of a laminated bathtub or shower-tray, wherein a reinforcing layer of polyurethane is applied to a surface of an acrylic shell, which process essentially consists of the steps of producing a preformed shell of an acrylic material; degreasing the said preformed shell; inserting the said degreased preformed shell into a matching, closable mould which mould provides a space for a layer of reinforcing material; forming by a reaction injection moulding step a reinforcing layer of rigid polyurethane that adheres directly to the shell, which step comprises injecting into the said mould space a mixture comprising a polyol material and an isocyanate material that react therein; and demoulding the resultant laminated article.

3. A process according to claim 1 or 2 characterised in that the rigid polyurethane has a density of 400 to 800 kg/m³.

4. A process according to claims 1 or 2, characterised in that the preformed shell is produced by thermoforming a sheet of acrylic material.

5. A process according to claims 1 or 2, characterised in that the preformed shell is formed of material selected from cell-cast acrylic and continuous cast-acrylic.

6. A process according to claims 1 or 2, characterised in that the mixture comprising the polyol and isocyanate materials is injected into the mould space at a temperature of from 50° to 70° C.

7. A process according to claims 1 or 2, characterised in that a blowing agent is introduced into the mould space such that the reinforcing layer comprises a rigid polyurethane foam.

8. A process according to claim 7, characterised in that the blowing agent is a halocarbon.

9. A process according to claims 1 or 2, characterised in that the said polyol and isocyanate materials are injected into the mould space together with a reinforcing filler selected from glass fibers, flake glass, wollastonite and mica.

10. A process according to claims 1 or 2, characterised in that the mixture comprising the polyol and isocyanate materials is injected into the mould space at a pressure from 345 to 690 kPa.

11. A process according to claims 1 or 2, characterised in that a reinforcing board is introduced into the space within the mould prior to the injection of the materials capable of reacting to form the reinforcing layer.

12. A process according to claim 11, characterised in that the reinforcing board is formed of a wood composite.

13. A process according to claim 11, characterised in that the mould comprises a male mould member and a female mould member; the preformed shell is positioned with one side thereof abutting a closely matching surface of the male mould member; and the reinforcing board is positioned between the preformed shell and the female mould member, there being a constant clearance between the reinforcing board and the preformed shell and between the reinforcing board and the said female mould member.

* * * * *